United States Patent
Hosur et al.

(10) Patent No.: US 7,522,674 B2
(45) Date of Patent: Apr. 21, 2009

(54) LINEARLY INDEPENDENT PREAMBLES FOR MIMO CHANNEL ESTIMATION WITH BACKWARD COMPATIBILITY

(75) Inventors: Srinath Hosur, Plano, TX (US); Michael O. Polley, Garland, TX (US); Manish Goel, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 608 days.

(21) Appl. No.: 10/884,363

(22) Filed: Jul. 2, 2004

(65) Prior Publication Data

US 2006/0007908 A1 Jan. 12, 2006

(51) Int. Cl.
*H04B 7/04* (2006.01)
*H04L 27/28* (2006.01)
(52) U.S. Cl. .................... 375/267; 375/260
(58) Field of Classification Search ............ 375/267; 370/350, 503, 203
See application file for complete search history.

(56) References Cited

U.S. PATENT DOCUMENTS

| | | | |
|---|---|---|---|
| 6,658,063 B1 * | 12/2003 | Mizoguchi et al. ......... | 375/260 |
| 7,062,703 B1 * | 6/2006 | Keaney et al. .............. | 714/807 |
| 2004/0147289 A1 * | 7/2004 | Paljug et al. ............. | 455/562.1 |
| 2004/0218568 A1 * | 11/2004 | Goodall et al. ............. | 370/332 |
| 2004/0229650 A1 * | 11/2004 | Fitton et al. ................. | 455/561 |
| 2005/0008092 A1 * | 1/2005 | Kadous ..................... | 375/267 |
| 2005/0136933 A1 * | 6/2005 | Sandhu et al. .............. | 455/450 |
| 2005/0141407 A1 * | 6/2005 | Sandhu ....................... | 370/203 |
| 2005/0195733 A1 * | 9/2005 | Walton et al. ............... | 370/208 |
| 2006/0098605 A1 * | 5/2006 | Li ............................... | 370/338 |
| 2006/0193277 A1 * | 8/2006 | Keaney et al. ............. | 370/310 |
| 2006/0252386 A1 * | 11/2006 | Boer et al. ................. | 455/101 |

* cited by examiner

*Primary Examiner*—Shuwang Liu
*Assistant Examiner*—David Huang
(74) *Attorney, Agent, or Firm*—Steven A. Shaw; W. James Brady; Frederick J. Telecky, Jr.

(57) ABSTRACT

A device and a method of characterizing a communications channel. The method includes transmitting a first part of a packet preamble using two or more antennas and transmitting a second part of the packet preamble using the two or more antennas. Each antenna transmits an orthogonal encoding of the second part of the packet preamble. The method also includes transmitting a packet header using the two or more antennas and transmitting a packet payload using the two or more antennas. Each antenna transmits an orthogonal encoding of the packet header. The packet payload may be encoded across the transmissions of the two or more antennas.

7 Claims, 4 Drawing Sheets

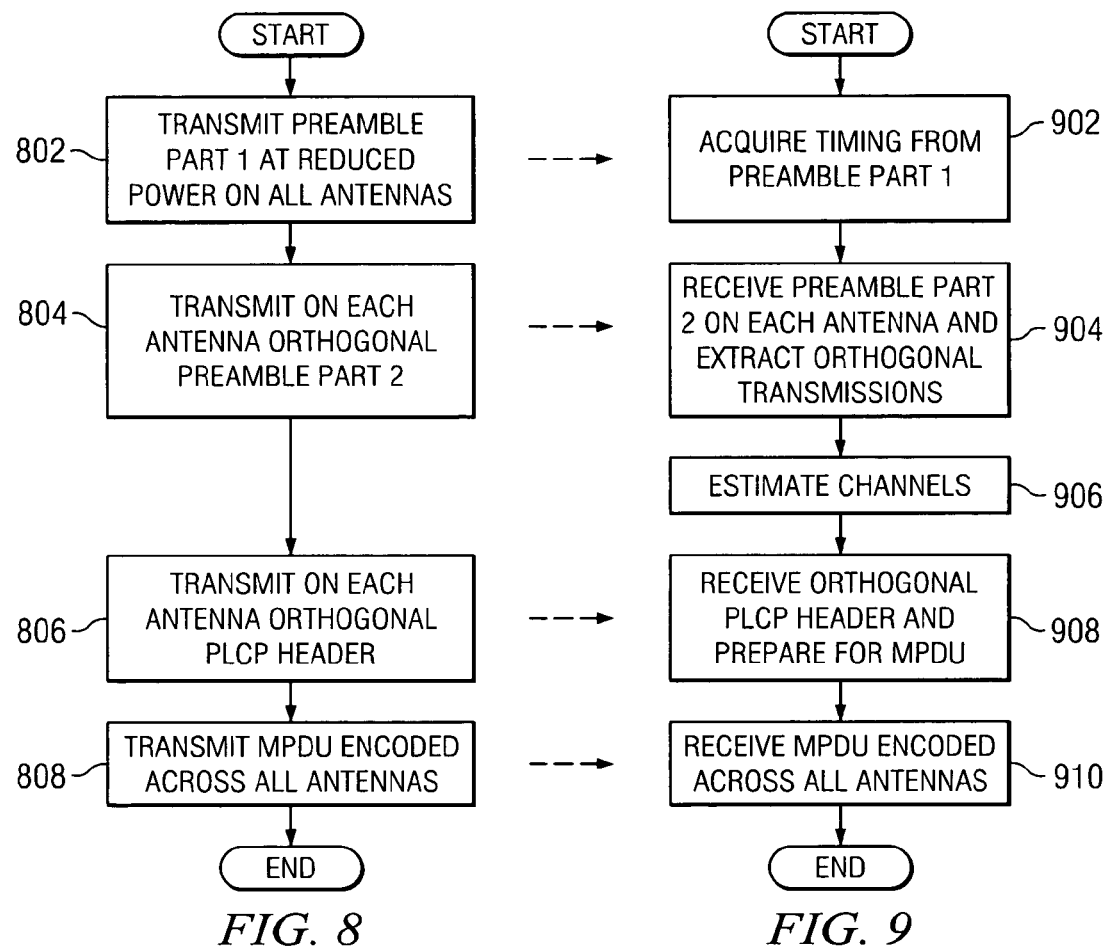

LINEARLY INDEPENDENT PREAMBLES FOR MIMO CHANNEL ESTIMATION WITH BACKWARD COMPATIBILITY

BACKGROUND

A network is a system that allows communication between members of the network. Wireless networks allow such communications without the physical constraints of cables and connectors. Recently, wireless local area networks (a local area network is a computer network covering a local area such as an office or a home) with ranges of about 100 meters or so have become popular. Wireless local area networks are generally tailored for use by computers, and as a consequence such networks provide fairly sophisticated protocols for establishing and maintaining communication links.

The Open Systems Interconnection (OSI) reference model is a standard reference model for communication between end users in a communications network. The OSI reference model has seven layers, the physical, data-link, network, transport, session, presentation, and application layers. The IEEE 802.xx wireless network standards are just a few examples of industry communications standards that have been based on the OSI reference model.

In general terms, the data link layer and the physical layer are directly involved in characterizing a communications channel. The data-link layer handles communications initialization, error checking, and flow control, which are part of a defined Media Access Control (MAC) protocol. The data-link layer exchanges MAC protocol data units (MPDUs) with the physical layer. The MPDUs are frames that may include payload data, headers for a protocol from various higher layers and a frame checksum.

The physical layer is responsible for transmitting and receiving digital information via the physical transport medium (e.g., in a wireless network, high frequency electromagnetic signals serve as the physical transport medium). The physical layer is often subdivided into the physical medium dependent (PMD) sublayer and the physical layer convergence procedure (PLCP) sublayer. The PMD sublayer handles the conversion requirements specific to the physical transport medium. The PLCP sublayer accepts from the data link layer MPDUs to be transmitted, and provides to the data-link layer MPDUs that it has received.

The PLCP sublayer extends MPDUs to be transmitted with information germane to their transport, and extracts MPDUs from received data. Referring now to FIG. 1, the frames transmitted and received by the PLCP layer may include a PLCP preamble 110, a PLCP header 120, and a MPDU 130, which together may be called a PPDU 100 (PLCP Protocol Data Unit).

System designers are working to enhance wireless network performance. One proposed standard involves the use of multiple antennas to increase channel diversity (and thereby increase performance). However, the designers wish to maintain backwards compatibility with existing single-antenna systems. It is thus desirable to implement a convenient way to determine channel estimation from a received transmission using multiple antennas while maintaining backward compatibility with single antenna systems.

SUMMARY

Methods of characterizing a communications channel are provided. In one embodiment, the method includes transmitting a PLCP Protocol Data Unit (PPDU) using two or more antennas. The PPDU includes a preamble having first and second parts. As the second part of the preamble is transmitted, each antenna transmits a linearly independent encoding of the second part. The preamble may be followed by a PLCP header and an MAC Protocol Data Unit (MPDU), each transmitted using the two or more antennas. Each antenna may transmit a linearly independent encoding of the PLCP header, while the MPDU may be encoded across the transmissions of the two or more antennas.

NOTATION AND NOMENCLATURE

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

BRIEF DESCRIPTION OF THE DRAWINGS

For a more detailed description of the preferred embodiments of the present invention, reference will now be made to the accompanying drawings, wherein:

FIG. 8 shows a transmitter implementation of a method to characterize a multiple-input multiple-output (MIMO) channel; and FIG. 9 shows a receiver implementation of a method to characterize a MIMO channel.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to suggest that the scope of the disclosure, including the claims, is limited to that embodiment.

Figure 1:
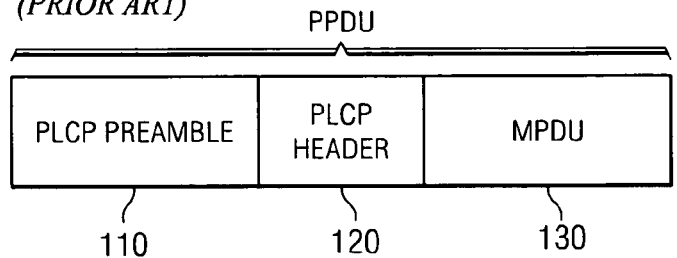
FIG. 1 shows a diagram of a generic, prior art PLCP Protocol Data Unit (PPDU)
Figure 2:
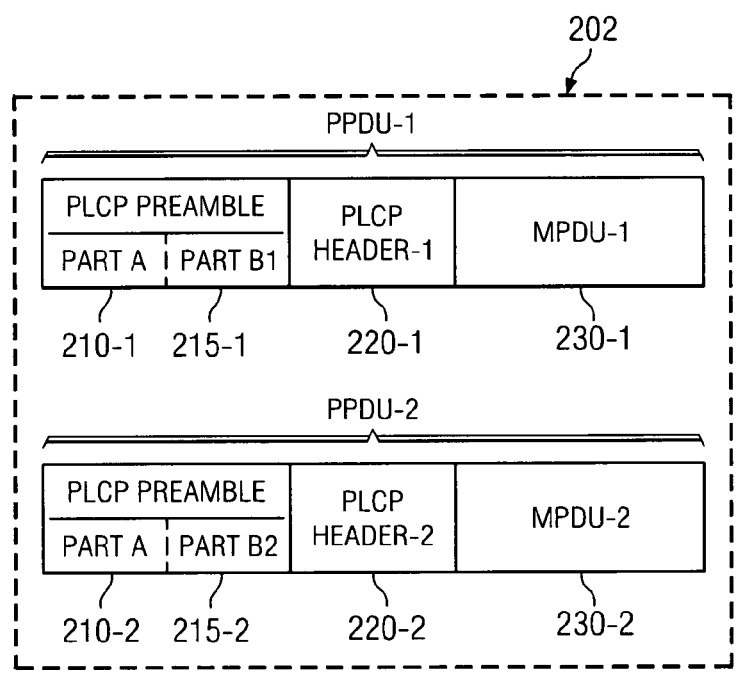
FIG. 2 shows a diagram of a PPDU according to one embodiment of the present invention.

FIG. 2 shows a diagram of a PLCP Protocol Data Unit (PPDU) 202 suitable for use in a multiple-input multiple-output (MIMO) system. The embodiment shown assumes the use of two transmit antennas, but the methods disclosed herein may be readily extended to a larger number of antennas. As shown, PPDU 202 comprises a PPDU component for each antenna. The PPDU component for the first antenna is labeled PPDU-1, while the PPDU component for the second antenna is labeled PPDU-2. Each component includes a respective PLCP preamble (having two parts labeled 210 (Part A) and 215 (Part B)), a PLCP header 220, and a MAC Protocol Data Unit (MPDU) 230. The numerals are appended with a -1 or -2 to indicate the PPDU component to which they belong.

According to various embodiments, the PLCP preambles and the PLCP headers of the PPDU components add together to simulate a PLCP preamble and PLCP header of a prior art PPDU. This constraint allows a legacy device to operate as if it were in communication with a single antenna device. However, the PPDU components are defined to allow a receiving MIMO device to characterize the channel between each transmitting antenna and each receiving antenna. With this information, MIMO devices may be able to exploit channel diversity information to enhance reception and increase the communications rate.

In one particular embodiment, the preamble of PPDU-1 includes a first part 210-1 (Part A1) and a second part 215-1 (Part B1). The preamble of PPDU-2 also includes a first part 210-2 (Part A2) and a second part 215-2 (Part B2). The second part of both preambles (Parts B1 and B2) are linearly independent (and preferably orthogonal), and may include a sequence of channel symbols designed to provide information for channel characterization. The orthogonal design is described in more detail below.

The first part of both preambles may be identical, and may include a sequence of ten channel symbols designed to provide a pattern for timing synchronization and automatic gain control. (The channel symbols may be formed using discrete multi-tone modulation as provided in the IEEE 802.11 family of standards.) In an alternative embodiment, the first part of the preambles is not identical, e.g., in one implementation, only one of the first parts is non-zero, and the first part of the other preambles is suppressed. In another illustrative implementation, the first parts are orthogonal as described for the second parts below.

The PLCP headers of PPDU-1 and PPDU-2 may also be linearly independent (and preferably orthogonal). The headers provide information concerning the modulation, rate, and length of the MPDU components MPDU-1 and MPDU-2. The modulation of the MPDU components is not critical to the disclosed methods, but it is expected that when the PPDU is directed to a multi-antenna receiver, the MPDU components will be jointly encoded to exploit channel diversity effects in MIMO systems. Conversely, when the PPDU is directed to a single antenna receiver, the MPDU components will add to simulate the transmission of a single antenna transmitter. One way to accomplish this simulation is to maintain the orthogonal or linearly independent signaling method employed by the preamble and header components.

Figure 3A:
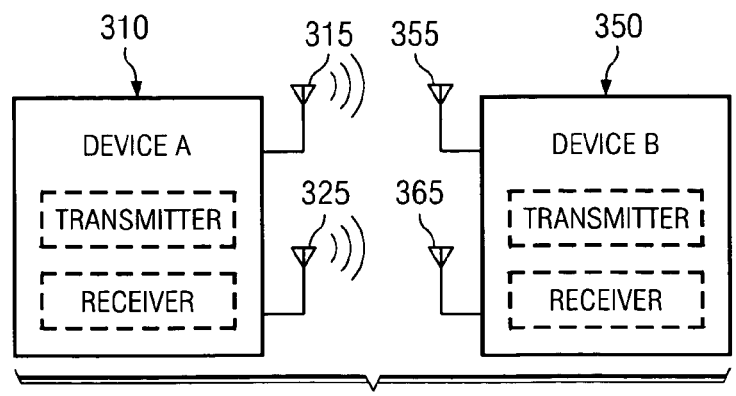
FIGS. 3A-3C show three different communications systems embodiments.
Figure 3B:
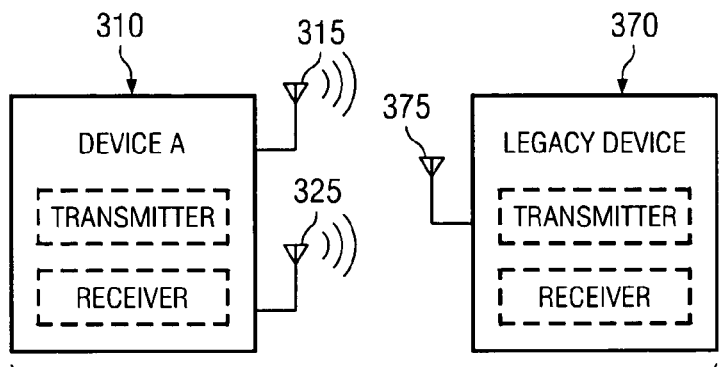
Figure 3C:
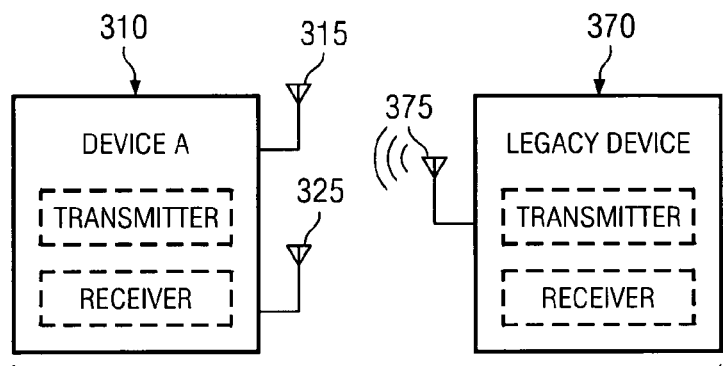

Referring now to FIGS. 3A-3C, three different communications system embodiments are shown. Although the disclosed methods may be employed in systems involving more than two devices, the illustrative systems are limited to two devices for ease of explanation. In FIG. 3A, a first multi-antenna device 310 is transmitting a PPDU to a second multi-antenna device 350. Device 310 includes a first antenna 315 and a second antenna 325. Device 350 includes a first antenna 355 and a second antenna 365. FIG. 3A is thus a representation of a multiple-input multiple output (MIMO) channel.

The operation of devices 310 and 350 in accordance with methods disclosed herein may advantageously improve MIMO channel estimation using the disclosed PPDU components of FIG. 2. The device 310 may advantageously use each antenna 315 and 325 to transmit the PPDU components in combination such that device 350 is able to receive the combined PPDU using the antennas 355 and 365 in combination. Thereafter device 350 may employ knowledge of the PPDU components to extract MIMO channel characteristics from the received signals.

As shown in FIG. 3B, a legacy device 370 having only a single antenna 375 may receive a PPDU from multi-antenna device 310. FIG. 3C shows the reverse situation, in which device 310 may receive a PPDU from a legacy device 370. In both situations, the operation of device 310 in accordance with methods disclosed herein may advantageously maintain compatibility with transmission channel estimation methods of legacy receivers, and may advantageously maintain receive compatibility with the transmissions of legacy transmitters.

Figure 4:
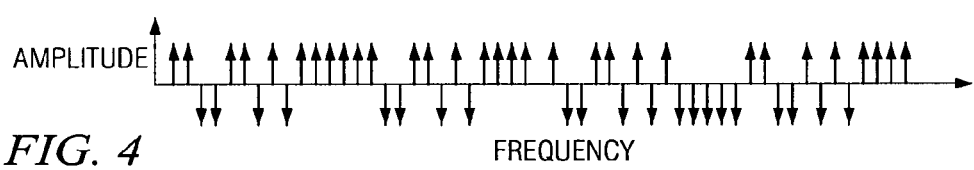
FIG. 4 shows carrier signals in an illustrative preamble.

FIG. 4 shows the frequency spectrum of an illustrative channel symbol that may be employed for channel estimation. As part of the IEEE 802.11a-1999 wireless systems standard, such channel symbols are in fact employed for channel estimation in Part B of PLCP preambles. To maintain compatibility with 802.11a wireless communication devices the PLCP preamble components should sum to equal the illustrative channel symbol.

Figure 5A:
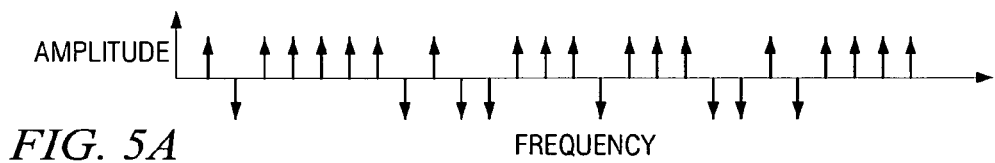
FIGS. 5A-5B show orthogonal preambles in accordance with one embodiment.
Figure 5B:
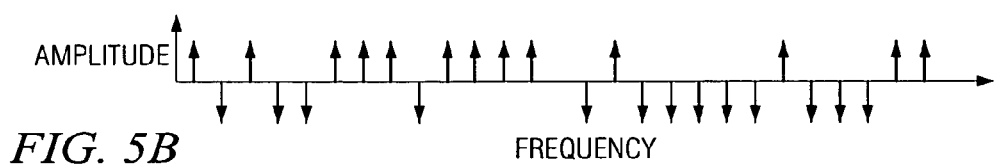

As shown in FIG. 4, the baseband channel symbol includes 53 carriers (counting the zero-amplitude DC component) having normalized amplitudes of +1, 0, and −1 as shown. (The actual signal will be scaled by some constant to control the transmit power.) For a two-antenna system, these carriers may be split into odd and even-numbered carriers as shown in FIGS. 5A and 5B, respectively. The channel symbol of FIG. 5A is thus orthogonal to the channel symbol of FIG. 5B. In one embodiment, the Part B1 preamble component is comprised of the channels symbols shown in FIG. 5A, while the Part B2 preamble component is comprised of channel symbols shown in FIG. 5B.

For a three-antenna system, the carriers may be split into three sets, each set including every third carrier. Each antenna would carry a preamble component having channel symbols formed from a respective set of carrier signals. Orthogonal channel symbols may be formed in this manner for any given number of transmit antennas.

At the receiver, each antenna of the receiver measures the received preamble. Because the linearly independent components are known to the receiver, the receiver can extract the contribution of each transmitting antenna to each preamble measurement. From this contribution, properties of the channel between each transmitting antenna and each receiving antenna may be determined. In the foregoing example, each transmitter is providing only 26 carriers (instead of the 52 in the original channel symbols). Consequently, the channel parameters can only be measured at 26 frequencies rather than 52 frequencies. Frequency interpolation may then be used to determine the channel attenuation and delay the missing frequencies.

In a more general sense, it is desired that during channel characterization, each transmitting antenna transmit a signal that is orthogonal to the signals being simultaneously transmitted on other antennas. Although the carrier-separation method disclosed in FIGS. 5A and 5B has an advantage in its simplicity, other orthogonal separation methods may be employed.

In an alternative embodiment, the orthogonal channel symbols may be formed as provided below. Assume that the powers of the transmitted channel symbols on two antennas have to add to equal the a legacy channel symbol power. Expressing the normalized carrier amplitudes on the first antenna as $A_i$:

$$A_i = \begin{cases} xS_i, & i \text{ is even} \\ yS_i, & i \text{ is odd} \end{cases},$$

where $S_i$ is the normalized carrier signal amplitude as provided in FIG. 4, and where i is the carrier frequency index which ranges from −26 to 26, we need the normalized carrier amplitudes on the second antenna $B_i$ to be:

$$B_i = \begin{cases} (1-|x|^2)^{1/2} S_i, & i \text{ is even} \\ (1-|y|^2)^{1/2} S_i, & i \text{ is odd} \end{cases}.$$

An orthogonality criterion between pair-wise vectors can be expressed:

$$[A_i, A_{i+1}] \cdot [B_i, B_{i+1}]^T = 0,$$

which translates into a requirement that $$x(1-|x|^2)^{1/2} + y(1-|y|^2)^{1/2} = 0.$$

There are three non-trivial solutions to this equation, namely:

$$x = -y \text{ for } -1 \leq y \leq 1,$$

$$x = -\sqrt{1-y^2} \text{ for } -1 \leq y \leq 1, \text{ and}$$

$$y = -\sqrt{1-x^2} \text{ for } -1 \leq x \leq 1.$$

Figure 6A:
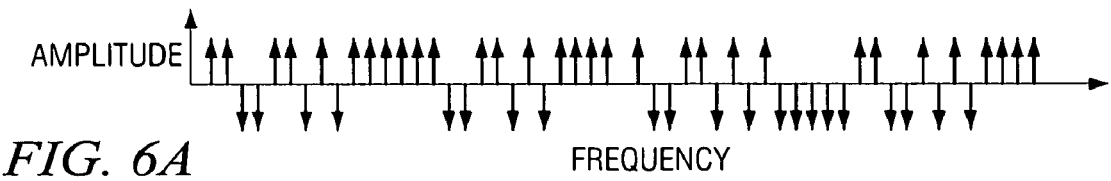
FIGS. 6A-6B show orthogonal preambles in accordance with a second embodiment.
Figure 6B:
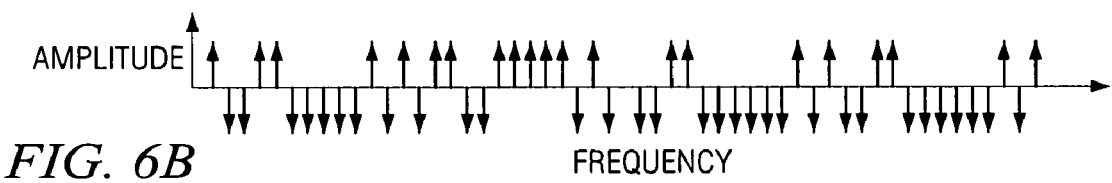

The last two solutions represent a unit circle's arcs in the second and fourth quadrants. Nearly any of the points provided by these solutions may be used to provide orthogonal components. FIGS. 6A and 6B show an example of orthogonal channel symbols obtained with x=+1/sqrt(2) and y=−1/sqrt(2). An equivalent normalized expression provides normalized amplitudes of:

$$A_i = \begin{cases} S_i, & i \text{ is even} \\ -S_i, & i \text{ is odd} \end{cases}, \text{ and}$$

$$B_i = S_i.$$

Assuming that a receiving antenna measures (complex) carrier amplitudes $R_i$, then $R_i$ is expressible as:

$$R_i = rA_i + sB_i,$$

where r and s are complex channel attenuation values. Assuming orthogonality and a constant channel parameter for adjacent frequency carriers, channel parameter measurements may be made as provided below:

$$[R_i, R_{i+1}] \begin{bmatrix} A_i & B_i \\ A_{i+1} & B_{i+1} \end{bmatrix} = [r, s] \begin{bmatrix} A_i & A_{i+1} \\ B_i & B_{i+1} \end{bmatrix} \begin{bmatrix} A_i & B_i \\ A_{i+1} & B_{i+1} \end{bmatrix}$$

$$= [r(x^2 + y^2), s((1-x^2) + (1-y^2))].$$

Since the quantities in parenthesis are known, r and s are easily calculated.

An advantage of this alternative approach is that, having calculated r and s for a given pair, i can be incremented by one (rather than by two), and the process repeated. This process will provide almost twice as many channel parameter measurements as the carrier separation method. In another alternative embodiment, interpolations are made between alternate received carrier amplitudes to obtain a predicted carrier amplitude for each carrier. Due to the construction of the linearly-independent preambles, the predicted carrier amplitude and the actual receiver carrier amplitude are linearly independent, and they may be combined to determine channel attenuation values r and s individually for each carrier.

In another alternative embodiment, we waive the restriction that the channel symbols transmitted on different antennas be orthogonal. As long as linear independence exists between symbol carrier coefficients, the channel parameters can be calculated by the receiver.

Figure 7:
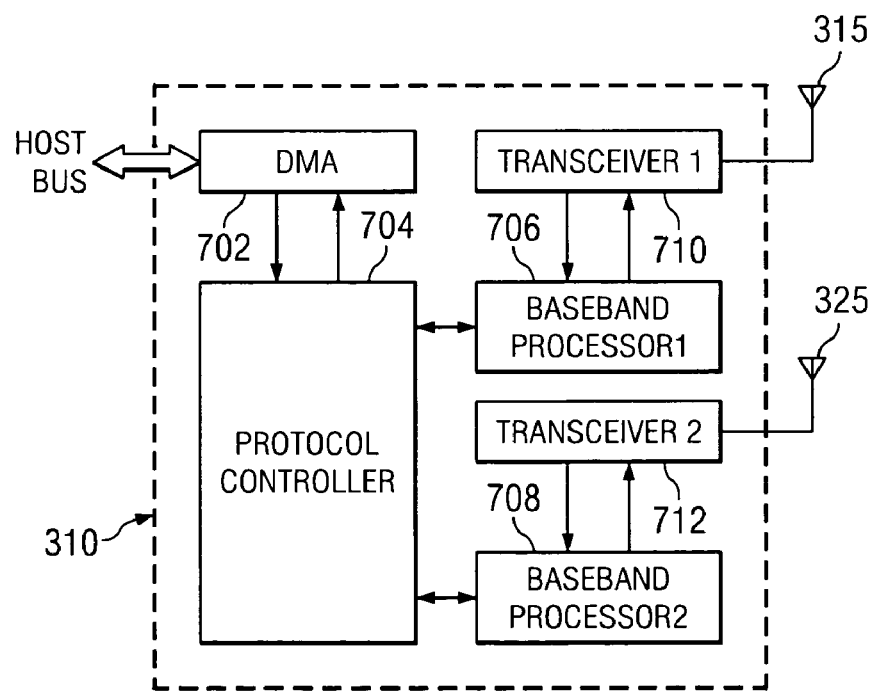
FIG. 7 shows a block diagram of an illustrative wireless device.

FIG. 7 shows a block diagram of an illustrative device 310. Device 310 may include a direct memory access (DMA) module 702 for managing intra-device data transfers to and from the wireless communications circuitry. A protocol controller 704 is coupled to the DMA module 702 to receive outgoing transmission data and to provide incoming receive data. Protocol controller 704 may perform data-link layer functions (including media access control functions), as well as physical layer functions such as creating PLCP protocol data units (PPDUs) constructed in accordance with the foregoing disclosure and providing the PPDU components to baseband processors 706, 708. Other physical layer functions implemented by the protocol controller may include receiving PPDUs from the baseband processors and performing calculations to characterize channel attenuation and delays between each transmitting antenna and each receiving antenna. The channel characterizations may be provided to the baseband processors to enhance receive signal quality.

Baseband processors 706 and 708 may include digital transmit filters, digital receive filters, and digital detection/equalization circuitry. Baseband processors may further include error correction encoding/decoding circuits, Fast Fourier Transform (and inverse transform) modules, and other components suitable for use in discrete multi-tone modulation/demodulation circuitry. Baseband processors 706, 708 respectively couple to transceivers 710, 712. The transceivers convert outgoing digital signals into analog form and upconvert the baseband signals into specified frequency bands before providing the outgoing signals to respective antennas. Conversely, the transceivers also receive incoming signals from their respective antennas, downconvert the incoming signals to baseband, and convert analog incoming signals into digital form for the baseband processors.

FIG. 8 shows a flowchart of a method for transmitting packets in a MIMO system that may be implemented by device 310. In block 802, a device transmits a timing synchronization signal (Part A of the packet preamble) on at least one of the transmit antennas. When sending on multiple antennas, the amplitude of each transmit signal may be reduced, so that the sum of the transmitted signals will approximate the timing synchronization signal that would be expected from a single antenna transmitter. In other words, when sending on two antennas, the signal amplitude may be reduced by 1/sqrt(2) to provide half power from both antennas. Alternatively, both antennas could send at full strength to double the power of the synchronization signal. In yet another embodiment, the timing synchronization signal may be sent at full strength on one antenna and suppressed (i.e., zero) on the other antenna. In still another embodiment, the timing synchronization signal may be sent using orthogonal or linearly independent components on each antenna as described for the channel characterization signal below.

In block 804, the device transmits orthogonal or linearly independent components of a channel characterization signal (Part B of the packet preamble) on each of the transmit antennas. The use of linearly independent components (orthogonality is a special case of linear independence) allows for the determination of each transmit signal to the receive signal at each receive antenna.

In block 806, the device transmits orthogonal or linearly independent components of a packet header on each of the transmit antennas. The continued use of orthogonal or linearly independent components preserves the channel relationship that has been measured by any legacy devices that assumed a single transmit antenna. The packet header provides the modulation information regarding a data payload, and if the packet is not directed to a legacy device, it is expected that the legacy device will determine that it is not a target and ignore the rest of the packet. Thus backward compatibility concerns may be ignored after the completion of the packet header. Accordingly, in block 808, the device transmits the data payload in a manner that makes best use of the MIMO system capabilities. It is expected that transmit signal orthogonality or linear independence will not be maintained for the data payload unless the target device is a legacy device that expects transmissions from a single antenna. In this latter case, the transmit signal orthogonality or linear independence may be maintained throughout the transmission of the remainder of the packet.

FIG. 9 shows a method for receiving packets in a MIMO system that may be implemented by device 310. In block 902, the device receives a timing synchronization signal and acquires timing synchronization. In block 904, the device receives a channel characterization signal on each antenna. Thereafter, the device employs the predefined orthogonal or linearly independent structure to determine the contributions of each transmit signal to each receive signal. In block 906, the device characterizes the channel between each transmit antenna and each receive antenna using the results of the previous block. As described previously, this may include interpolation to estimate channel attenuation and delay at missing frequencies. Note that this characterization process can be successfully employed even if there are fewer transmit antennas than the number assumed by the receiving device.

In block 908, the device receives the packet header, and from the packet header, determines the modulation scheme, data rate, and length of the data payload. In block 910, the device receives the rest of the packet and extracts the data in accordance with the parameters from the packet header.

In various embodiments, the described devices may employ the IEEE 802.11a/g protocol. In such embodiments, Part A of the preamble may include the short sequence of ten symbols. In two-antenna systems, Part B1 of the preamble may include even carrier tones from two long symbols, while Part B2 includes odd carrier tones from two long symbols.

The communications systems may be representative of, or adapted to, a wide variety of electronic systems. An exemplary electronic system may comprise a battery-operated, mobile cell phone 155 and base station 105. Other portable wireless devices are also contemplated.

While certain embodiments have been shown and described, modifications thereof can be made by one skilled in the art without departing from the spirit and teachings of the appended claims. The embodiments described herein are exemplary only, and are not intended to be limiting. Many variations and modifications of the embodiments disclosed herein are possible and are within the scope of the appended claims. Accordingly, the scope of protection is not limited by the description set out above.

What is claimed is:

1. A wireless communications method, comprising:
transmitting a time synchronization signal on at least one of multiple antennas; and
transmitting on each of the multiple antennas a respective, linearly-independent and orthogonal component of a channel characterization signal, wherein the channel characterization signal components consist of channel symbols, the channel symbols for each component having shared carrier tones with amplitudes that provide an orthogonal relationship between neighboring carrier tones of different components and wherein a sum of the channel characterization signal component powers approximates a channel characterization signal component powers for a single antenna device; and
after transmitting the channel characterization signal components, transmitting on each of the multiple antennas a respective orthogonal component of a packet header signal, wherein a sum of orthogonal packet header component powers approximates a packet header signal power for the single antenna device, wherein the orthogonal relationship is $$[A_i, A_{i+1}] \cdot [B_i, B_{i+1}]^T = 0,$$

wherein $A_i$ is the amplitude of carrier i of a first channel symbol component, wherein $B_i$ is the amplitude of carrier i of a second channel symbol component, wherein $A_i$ and $B_i$ are related as follows:

$$A_i = \begin{cases} xS_i, & i \text{ is even} \\ yS_i, & i \text{ is odd} \end{cases}$$

$$B_i = \begin{cases} (1-|x|^2)^{1/2} S_i, & i \text{ is even} \\ (1-|y|^2)^{1/2} S_i, & i \text{ is odd} \end{cases}$$

wherein $S_i$ is a carrier signal amplitude of a channel characterization signal for the single antenna device, and x and y are scaling factors.

2. A wireless communications method, comprising:
transmitting a time synchronization signal on at least one of multiple antennas; and
transmitting on each of the multiple antennas a respective, linearly-independent and orthogonal component of a channel characterization signal, wherein the channel characterization signal components consist of channel symbols, the channel symbols for each component having shared carrier tones with amplitudes that provide an orthogonal relationship between neighboring carrier tones of different components and wherein a sum of the channel characterization signal component powers approximates a channel characterization signal power for a single antenna device; and
after transmitting the channel characterization signal components, transmitting on each of the multiple antennas a respective orthogonal component of a packet header signal, wherein a sum of orthogonal packet header component powers approximates a packet header signal power for the single antenna device, wherein the orthogonal relationship is $$[A_i, A_{i+1}] \cdot [B_i, B_{i+1}]^T = 0,$$

wherein $A_i$ is the amplitude of carrier i of a first channel symbol component, wherein $B_i$ is the amplitude of carrier i of a second channel symbol component, wherein $A_i$ and $B_i$ are related as follows:

$$A_i = \begin{cases} S_i, & i \text{ is even} \\ -S_i, & i \text{ is odd} \end{cases}, \text{ and}$$

$$B_i = S_i,$$

wherein $S_i$ is a carrier signal amplitude of a channel characterization signal for the single antenna device.

3. A wireless communications method, comprising:

receiving on each of multiple receive antennas a time synchronization signal;

receiving on each of the multiple receive antennas a channel characterization signal; and estimating for each receive antenna a contribution to the channel characterization signal from each of multiple transmit antennas comprising:

combining each received channel characterization signal with each of multiple orthogonal components of the channel characterization signal, wherein the orthogonal components consist of channel symbols, the channel symbols for each component having shared carrier tones with amplitudes that provide on orthogonal relationship between neighboring carrier tones of different components, wherein the orthogonal relationship is $[A_i,A_{i+1}]\cdot[B_i,B_{i+1}]^T=0$, wherein $A_i$ is the amplitude of carrier i of a first component, wherein $B_i$ is the amplitude of carrier i of a second component, wherein $A_i$ and $B_i$ are related as follows:

$$A_i = \begin{cases} xS_i, & i \text{ is even} \\ yS_i, & i \text{ is odd} \end{cases}$$

$$B_i = \begin{cases} (1-|x|^2)^{1/2}S_i, & i \text{ is even} \\ (1-|y|^2)^{1/2}S_i, & i \text{ is odd} \end{cases}$$

wherein $S_i$ is a carrier signal amplitude of a channel characterization signal for a single antenna device, and x and y are scaling factors.

4. A wireless communications method, comprising:

receiving on each of multiple receive antennas a time synchronization signal;

receiving on each of the multiple receive antennas a channel characterization signal; and estimating for each receive antenna a contribution to the channel characterization signal from each of multiple transmit antennas comprising:

combining each received channel characterization signal with each of multiple orthogonal components of the channel characterization signal, wherein the orthogonal components consist of channel symbols, the channel symbols for each component having shared carrier tones with amplitudes that provide an orthogonal relationship between neighboring carrier tones of different components, wherein the orthogonal relationship is $[A_i,A_{i+1}]\cdot[B_i,B_{i+1}]^T=0$, wherein $A_i$ is the amplitude of carrier i of a first channel symbol component, wherein $B_i$ is the amplitude of carrier i of a second channel symbol component, wherein $A_i$ and $B_i$ are related as follows:

$$A_i = \begin{cases} +S_i, & i \text{ is even} \\ -S_i, & i \text{ is odd} \end{cases}$$

$$B_i = S_i$$

wherein $S_i$ is a carrier signal amplitude of a channel characterization signal for a single antenna device.

5. The method of claim 3 or 4, wherein the number of multiple receive antennas is two.

6. The method of claim 3 or 4, wherein the number of multiple receive antennas is three or more.

7. The method of claim 3 or 4, further comprising:

characterizing a channel between each transmit antenna and each receive antenna;

receiving on each of multiple receive antennas a packet header signal; and receiving on each of multiple receive antennas a packet payload.

* * * * *